United States Patent Office 3,385,901
Patented May 28, 1968

3,385,901
FLUORINATED CARBINOLS AND METHOD
OF PREPARING SAME
Christ Tamborski, Dayton, Ohio, and Laurence W. Breed,
Overland Park, Kans., assignors, by direct and mesne
assignments, to the United States of America as represented by the Secretary of the Air Force
No Drawing. Filed Apr. 6, 1965, Ser. No. 446,098
6 Claims. (Cl. 260—618)

ABSTRACT OF THE DISCLOSURE

The compounds are of the class of fluorinated carbinols and have the general formula

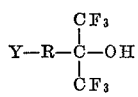

wherein R is a radical selected from the group consisting of

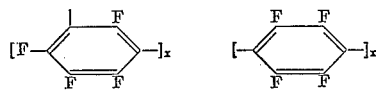

with $X=1, 2, 3$ and Y is an atom or radical selected from the group consisting of H, F, Cl, I, Br, —$CF_3$ and

which carbinols are useful in the preparation of synthetic resins.

The process for making these fluorinated carbinols comprises reacting organo-metallic reagents, such as pentafluorophenyllithium with hexafluoroacetone at a temperature of —55° C. followed by acidic hydrolyzing.

---

This invention relates to fluorinated carbinols and procedures for preparing carbinols having a number of fluorine atoms thereon. The carbinols thus produced are useful as intermediates for various organic reactions and particularly for use in production of oxidatively stable and heat resistant synthetic polymers which may be formed in accordance with conventional condensation reactions.

Condensation polymers such as the polycarbonates, polyurethanes, polyesters, polyphosphonate esters and similar synthetic resins have many important and varied uses but their utility is to a certain extent limited by considerations of oxidative stability and physical characteristics under high temperature applications.

It is therefore a primary object of the present invention to provide new fluorinated carbinols which may be condensed with conventional monomeric materials to produce fluorinated polymers of superior oxidative stability under high temperature applications and without sacrifice of the other desirable physical characteristics of fluorinated polymeric materials. An equally important object is to provide novel procedures for preparing the fluorinated carbinols defined above by use of easily controlled reactions capable of producing an economically feasible yield of the product with presently available processing equipment.

It is another important object of the invention to provide a fluorinated carbinol of the general formula

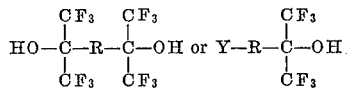

wherein R is a fluorinated aromatic group and Y is hydrogen, a halogen, fluoroalkyl or a substituted or unsubstituted paraffinic radical.

Another important object of this invention is to provide a novel procedure for preparing fluorinated carbinols as described above which may be easily and readily accomplished by preparing an organo-metallic reagent followed by reaction of this reagent wtih hexafluoroacetone under controlled temperature conditions and thus permitting preparation of the final carbinol by the simple expedient of hydrolysis of the adduct under acidic conditions.

It is thus believed apparent that an object of this invention is to provide an improved method of preparing fluorinated carbinols of the properties described and which may be used to produce a number of different carbinols utilizing the same basic steps, equipment and processing conditions.

Also an object of the invention is to provide a fluorinated compound adapted for use in preparation of derivatives and condensation polymers by virtue of an active group thereon in the nature of an hydroxyl radical or the like.

Fluorinated carbinols within the scope of this invention may best be prepared by reaction of a mono or bifunctional organometallic compound with hexafluoroacetone at a low temperature to produce an adduct which can be hydrolyzed under acidic conditions and thereby form a compound of the general formula (3)
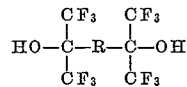

or (4)
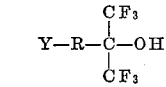

where R is a fluorinated aromatic group such as (1)
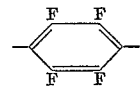

(2)
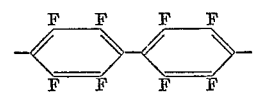

and Y is a group or atom including H, F, Cl, I, Br, [—$CF_3$], [—$CO_2H$], or

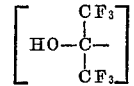

Specifically, compounds of the general Formulas 3 and 4 may be prepared by reacting various types of organometallic reagents of the general formula $M_2R$ or MRY wherein M is a metal or Grignard complex, with hexafluoroacetone at a temperature of at least −20° C. for Grignard reagents and at least −55° C. for materials such as organo-lithium reagents. Preparation of the organometallic compounds preferably is accomplished in accordance with the procedures set forth in an article in the Journal of Organic Chemistry, vol. 29, pp. 2385 to 2389, entitled "Reactions of Organometallics with Fluoroaromatic Compounds." The adduct produced therefrom is then hydrolyzed under acidic conditions employing sulfuric acid for example, to produce the final desired product that, upon separation and purification, may be utilized in the preparation of a number of different organic derivatives and other intermediates, as well as for condensation reactions with monomeric materials heretofore conventionally employed in the preparation of commercial synthetic resins.

Examples of preparation of compounds of the general Formulas 3 and 4 are as follows:

I. Preparation of perfluoro-$\alpha,\alpha$-dimethylbenzylalcohol from pentafluorophenylmagnesium bromide.—A solution of 0.075 mole of methylmagnesium bromide in 50 ml. of tetrahydrofuran was cooled to −20° C. and treated with 11.4 g. (0.068 mole) of pentafluorobenzene. The Grignard reagent thus produced was maintained at −20° C. while an excess of hexafluoroacetone was introduced above the surface of the stirred solution. The adduct, cooled to 0° C., was hydrolyzed with 50 ml. of 10% sulfuric acid. The organic phase was separated, combined with two 30 ml. ether extracts of the aqueous phase and dried over $Na_2SO_4$. Fractional distillation through a 18-cm. vacuum-jacketed micro column packed with helices gave 7.4 g. (33%) of perfluoro-$\alpha,\alpha$-dimethylbenzylalcohol B.P. 156–8° C., $n_N^{29}$ 1.3774:N.m.r.:OH at $\delta=4.23$ in $CDCl_3$ (TMS reference).

II. Preparation of perfluoro-$\alpha,\alpha$-dimethylbenzylalcohol from pentafluorophenyllithium.—Sixty ml. of a solution containing 0.077 mole of n-butyllithium in hexane was cooled to −55° C. and treated with 12.9 g. (0.077 mole) of pentafluorobenzene in 40 ml. of diethylether. The addition required 30 min. The product was stirred 2 hrs., then an excess of hexafluoroacetone was introduced above the surface of the stirred mixture. The temperature was maintained between −60° C. and −55° C. throughout the addition. After the adduct was warmed to 10° C. and hydrolyzed with 10% $H_2SO_4$, the organic layer and two 10 ml. ether extracts of the aqueous portion were combined and dried over $Na_2SO_4$. Fractional distillation in two similar experiments gave an average yield of 79% of the alcohol boiling at 158–60° C., $n_D^{26}$ 1.3780.

III. Preparation of perfluoro-$\alpha,\alpha$,p-trimethylbenzylalcohol.—A stirred mixture of 20 ml. of tetrahydrofuran and 15.8 ml. of a hexane solution containing 0.0252 mole of butyllithium and maintained at −60° C., was treated with a solution of 5.2 g. (0.0239 mole) of 4-trifluoromethyl-2,3,5,6-tetrafluorobenzene in 10 ml. of tetrahydrofuran during a 15 min. period. The mixture was stirred 30 min., then an excess of hexafluoroacetone was introduced above the surface of the liquid. After the adduct was warmed to room temperature, 40 ml. of ice water containing 6.0 ml. of $H_2SO_4$ was added, the organic layer was separated, the aqueous layer was extracted twice with ether, and the combined organic layer and extracts were dried over $Na_2SO_4$. Fractional distillation through a micro-Claisen head gave 5.5 g. (61%) of the alcohol boiling at 103–4° C., $n_D^{28}$ 1.3732.

IV. Preparation of perfluoro-1,4-phenylenebis(dimethylcarbinol).—A stirred mixture of 100 ml. of tetrahydrofuran and 93 ml. of a hexane solution containing 0.148 mole of butyllithium was treated with a solution of 21.7 g. (0.0705 mole) of dibromo-2,3,5,6-tetrafluorobenzene in 45 ml. of tetrahydrofuran at −60° C. The addition required 20 min. After an excess of hexafluoroacetone was introduced above the surface of the mixture, the adduct was hydrolyzed with dilute $H_2SO_4$, the organic layer separated, combined with ether extracts of the aqueous layer, and dried over $Na_2SO_4$. Evaporation of the solvents and two recrystallizations from petroleum ether (B.P. 60–90° C.) gave 24.0 g. (71%) of the diol, M.P. 94–5° C. N.m.r.:OH at $\delta=4.26$ in $CDCl_3$ (TMS reference).

V. Preparation of perfluoro-4,4'-biphenylenebis(dimethylcarbinol).—A solution of 2,3,5,6,2',3',5',6'-octafluorobiphenyl in 145 ml. of tetrahydrofuran was added over a 30 min. period to a stirred mixture of 100 ml. of tetrahydrofuran and 90 ml. of a hexane solution containing 0.144 mole of butyllithium at −60° C. After 1 hr. an excess of hexafluoroacetone was introduced above the liquid surface. The adduct was hydrolyzed with dilute sulfuric acid and the organic layer was separated and dried over $Na_2SO_4$. Evaporation of the solvents and recrystallization from chloroform gave 32.4 g. (74%) of the diol, which melted at 192–3° C.

VI. Preparation of perfluoro-4-H-$\alpha,\alpha$-dimethylbenzyl alcohol.—A rapidly stirred solution of 21.9 g. (0.146 mole) of 1,2,4,5-tetrafluorobenzene in 150 of tetrahydrofuran, and maintained at −65° C., was treated during a 45 min. period with 92 ml. of a hexane solution containing 0.146 mole of butyllithium. The product was stirred 2 hrs., then an excess of hexafluoroacetone was introduced above the surface of the liquid. The adduct was warmed to room temperature, hydrolyzed with dilute sulfuric acid and, the organic phase was separated, combined with ether extracts of the aqueous phase, and dried over $Na_2SO_4$. Evaporation of the solvents and recrystallization of the residue from petroleum ether (B.P. 60–90° C.) gave 21.3 g. (61% calculated on the basis of butyllithium) of perfluoro-1,4-phenylenebis(dimethylcarbinol), M.P. 93–4° C. Evaporation and distillation of the recrystallization liquors gave 4.9 g. (11%) of the monosubstituted alcohol boiling at 161–3° C.

As an example of a derivative which may be prepared from compounds of the general Formulas 3 and 4, the following is noted:

VII. Preparation of 2,4,6-tris(perfluoro-$\alpha,\alpha$-dimethylbenzyloxy)-s-triazine derivative of perfluoro-$\alpha,\alpha$-dimethylbenzyl alcohol.—A mixture of 3.5 g. (0.019 mole) of cyanuric chloride and 18.5 g. (0.057 mole) of perfluoro-$\alpha,\alpha$-dimethylbenzylalcohol in 80 ml. of toluene was treated with 6.9 g. (0.057 mole) of sym-collidine in 50 ml. of toluene and the product was refluxed 2 hrs. Filtration gave 8.8 g. (98%) of collidine hydrochloride. The filtrate was diluted with 25 ml. of toluene and 150 ml. of petroleum ether (boiling point 60–90° C.). The solvent was then evaporated to a volume of 75 ml. The product, 13.1 g. (64%), M.P. 198–200° C., separated and was collected by filtration. Recrystallization from xylene gave 11.2 g. (55%) of 2,4,6-tris(perfluoro-$\alpha,\alpha$-dimethylbenzyloxy)-s-triazine and melting at 197–8° C.

It is to be understood that although the specific examples set forth above show preparation of compounds of the general Formulas 3 and 4 wherein R is of the general Formulas 1 or 2, R may be a bifunctional fluorinated aromatic group of the general formula

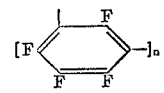

where $n=1,2,3 \ldots n$. The aromatic reagents reacted with hexafluoroacetone may include various groups for Y in addition to those specifically enumerated in Examples I–VI, including F, Cl, I, Br, H, [—$CF_3$], [—$CO_2H$] and

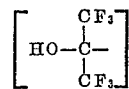

and atoms in groups chemically equivalent thereto for purposes of the present reactions.

Having thus described the invention what is claimed as new and desired to be secured by Letters Patent is:

1. A fluorinated carbinol having the formula

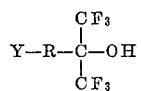

wherein R is a radical selected from the group consisting of

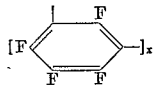

and

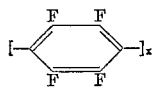

with $x=1$, 2 or 3 and Y is an atom or radical selected from the group consisting of H, F, Cl, I, Br, [—$CF_3$], and

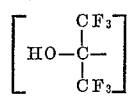

2. Perfluoro-α,α-dimethylbenzyl alcohol.
3. Perfluoro-α,αp-trimethylbenzyl alcohol.
4. Perfluoro-1,4-phenylenebis(dimethylcarbinol).
5. Perfluoro-4,4'-biphenylenebis(dimethylcarbinol).
6. Perfluoro-4-H-α,α-dimethylbenzyl alcohol.

References Cited
UNITED STATES PATENTS

| | | | |
|---|---|---|---|
| 3,236,894 | 2/1966 | England | 260—61 |
| 3,265,746 | 8/1966 | Wall et al. | 260—618 |
| 3,321,531 | 5/1967 | Hageldine et al. | 260—618 |

OTHER REFERENCES

Tarrant et al., Jour. Org. Chem., vol. 24, pp. 238–239 (1959).

Harper et al., Jour. Org. Chem. vol. 29, pp. 2385–2389 (1964).

BERNARD HELFIN, *Acting Primary Examiner.*

LEON ZITVER, *Examiner.*

H. MARS, *Assistant Examiner.*

Disclaimer 3,385,901.—*Christ Tamborski*, Dayton, Ohio, and *Laurence W. Breed*, Overland Park, Kans. FLUORINATED CARBINOLS AND METHOD OF PREPARING SAME. Patent dated May 28, 1968. Disclaimer filed Oct. 27, 1969, by the assignee, *United States of America as represented by the Secretary of the Air Force.*

Hereby enters this disclaimer to claim 2 of said patent.

[*Official Gazette April 7, 1970.*]